United States Patent [19]

Harris

[11] Patent Number: 4,536,196

[45] Date of Patent: Aug. 20, 1985

[54] COATED DIFFUSION MEMBRANE AND ITS USE

[75] Inventor: Jesse R. Harris, Bartlesville, Okla.

[73] Assignee: Phillips Petroleum Company, Bartlesville, Okla.

[21] Appl. No.: 358,570

[22] Filed: Mar. 16, 1982

Related U.S. Application Data

[63] Continuation of Ser. No. 185,712, Sep. 10, 1980, abandoned.

[51] Int. Cl.³ .............................................. B01D 53/22
[52] U.S. Cl. ........................................ 55/16; 585/818
[58] Field of Search ............... 55/16, 158; 252/470, 252/474; 585/818, 819

[56] References Cited

U.S. PATENT DOCUMENTS

| | | | |
|---|---|---|---|
| 2,773,561 | 12/1956 | Hunter | 55/16 |
| 3,148,031 | 9/1964 | Vahldieck et al. | 55/16 |
| 3,155,467 | 11/1964 | Yamamoto et al. | 55/158 X |
| 3,214,245 | 10/1965 | Peters, Jr. | 55/158 X |
| 3,290,406 | 12/1966 | Pfefferle | 585/818 X |
| 3,337,369 | 8/1967 | Frazier | 55/158 X |
| 3,344,582 | 10/1967 | Merrill et al. | 55/158 X |
| 3,350,846 | 11/1967 | Makrides et al. | 55/16 |
| 3,534,531 | 10/1970 | Eguchi et al. | 55/158 |
| 3,568,410 | 3/1971 | Coppola | 55/158 |
| 3,620,844 | 11/1971 | Wicke et al. | 55/158 X |
| 3,630,690 | 12/1971 | Coppola | 55/16 X |

Primary Examiner—Robert Spitzer
Attorney, Agent, or Firm—S. E. Reiter

[57] ABSTRACT

A palladium or palladium alloy is coated with a metal, e.g., titanium, and employed for diffusion of hydrogen.

9 Claims, No Drawings

COATED DIFFUSION MEMBRANE AND ITS USE

This is a continuation of application Ser. No. 185,712, filed Sept. 10, 1980, now abandoned.

BRIEF DESCRIPTION OF THE INVENTION

A membrane suitable for use in diffusing hydrogen from a mixture of it and another gas, e.g., palladium, is coated to increase its resistance to poisoning using at least one metal from Groups IB, IVB, VB, and VIB of the Periodic Table of the Elements. The coated membrane, e.g., palladium coated with titanium, can be used effectively, for example, to separate hydrogen from a hydrogen-ethylene mixture, much longer than is the case with the untreated membrane.

DETAILED DESCRIPTION

This invention relates to a coated diffusion membrane. It also relates to the use of a coated diffusion membrane for separating gases. In one of its aspects, the invention relates to a modified diffusion membrane which is suitable for use for periods of time much longer than the same membrane in unmodified conditions.

In one of its concepts, the invention provides a modified membrane, e.g., a titanium coated palladium diffusion membrane suitable for diffusing hydrogen from a mixture of it and another gas, e.g., ethylene. In another of its concepts, the invention provides a process for the separation of a gas from another gas by diffusion employing a membrane as herein described, e.g., the use of a titanium coated palladium hydrogen diffusion membrane for separating hydrogen from ethylene.

In a further concept of the invention, it provides a process for the dehydrogenation of hydrocarbons, e.g., the conversion of paraffin to olefin and hydrogen.

Palladium and certain alloys that comprise palladium are selectively permeable to hydrogen. A consequence of this property is that the equilibrium of gas phase reactions in which hydrogen is a reactant or a product can be affected by the presence of such a hydrogen permeable membrane. The process of dehydrogenation of hydrocarbons, e.g., the conversion of paraffins to monoolefins plus hydrogen—$C_nH_{2n+2}$—$C_nH_{2n}+H_2$—is exemplary of such reactions. The use of palladium membranes to affect favorably the conversion and selectivity of such reactions has already been studied. U.S. Pat. No. 3,290,406 discloses and claims such a process. The disclosure of the patent is incorporated herein by reference.

One drawback to the process is that at the temperatures at which hydrocarbon dehydrogenation becomes appreciable generally the palladium membrane becomes poisoned quite rapidly, thereby inhibiting the passage of hydrogen through the membrane and destroying its effectiveness.

I have found that treating a palladium membrane by depositing thereon a film of a transition metal prior to use will increase its resistance to poisoning. Therefore, it can be used for longer periods of time before regeneration is required.

A cause of poisoning of the membrane may be the deposition of a carbonaceous film thereupon.

An object of this invention is to provide a gas diffusion membrane. Another object of the invention is to provide a membrane suitable for use for extended periods of time to diffuse hydrogen generated in a dehydrogenation reaction conducted in the presence of said membrane. A further object of the invention is to provide an improved gas diffusion process. A further object of the invention is to provide for the diffusion of hydrogen from another gas employing an improved hydrogen diffusion membrane. A still further object of the invention is to provide a process for the dehydrogenation of hydrocarbon.

Other aspects, concepts, objects, and the several advantages of the invention are apparent from a study of this disclosure and the appended claims.

According to the present invention, there is provided a gas diffusion membrane, e.g., a palladium membrane suited for the diffusion of hydrogen, having thereupon a coating of at least one metal selected from Group IB, IVB, VB and VIB of the Periodic Table of the Elements.

Also according to the invention is provided a process for the treatment of gases, e.g., the dehydrogenation and/or gas separation, e.g., separation of hydrogen from a hydrocarbon, e.g., ethylene, by employing a coated membrane as herein described.

The metallic film that increases the resistance of the membrane to poisoning is applied by the process of ion plating, as provided by Coating Research Corp., Schaumburg, IL. The deposited film should be thick enough to cover completely the palladium membrane. However, excessively thick films reduce to a considerable extent the permeability of the membrane. A film having thickness in the range of about 0.01–0.1 micrometers is considered to be suitable.

The transition metals that are suitable for application to the palladium membrane to increase its resistance to poisoning are those of Groups IB, IVB, VB and VIB of the Periodic Table of the Elements. Titanium is presently the preferred metal because it is known to form a stable hydride. (Its use to passivate a membrane has been demonstrated.) Gold, vanadium, and tungsten are also considered to be suitable metals.

The coating of metals is known. Various processes for coating metals are known.

For the purposes of the present invention, the coating to be applied to the palladium and/or to its alloys is one which will function to increase its resistance to poisoning as evidenced by extended duration of time of functioning prior to a need for regeneration. Unnecessarily thick films will reduce to a considerable extent the permeability of the membrane. For the present invention, a film having a thickness in the range of from about 0.01 to about 0.1 micrometers is now preferred.

The coating can be applied by metal vaporization and condensation. It can be applied electrolytically. It can be applied by high temperature filament vaporization and condensation. In any event, however applied, the coating will be one which is suited for the desired operation. One skilled in the art in possession of this disclosure having studied the same can determine by test the optimum coating for his purpose.

Of the transition metals suitable for application to the palladium membrane to increase its resistance to poisoning, titanium is presently preferred. It is known to form a stable hydride.

EXAMPLE

The effect of titanium plating was shown in runs made with 75 weight percent palladium—25 weight percent silver tubular membranes that were 0.1588 cm. (0.0625 in.) o.d. × 0.0102 cm. (0.004 in.) wall thickness. The membrane used for a control was 13.02 cm. (5.125 in.) long; the membrane subject to titanium coating by Coating Research Corporation was 14.61 cm. (5.75 in.) long. They stated that the thickness of the titanium film which was applied to the outside of the tube was 0.1 micrometer. Extensions of 0.3175 cm. (0.125 in.) o.d. stainless tubing were attached to the ends of both membranes by cold brazing.

To make a run in which the membrane was used to separate hydrogen from a hydrogen-ethylene mixture it was secured concentrically in a 0.9525 cm. (0.375 in.) o.d. stainless steel tube with Swagelok connectors and provision was made for two separate gas streams, one to pass through the membrane and the other to flow through the outer annulus. Before starting each run the membrane was heated for 15 minutes at 350° C. with hydrogen gas flowing on both the inside and outside of the membrane. Hydrogen was removed by purging with argon while the temperature was raised to 450° C. and then the run was made as follows: hydrogen gas with or without added ethylene (both were metered with flowmeters) was flowed at superatmospheric pressure on one side of the membrane; a stream of argon at a measured rate was flowed on the other side of the membrane to carry hydrogen gas that has permeated or diffused through it. Hydrogen-ethylene mixtures were flowed through the inside of the untreated palladium alloy membrane but around the outside of the titanium treated membrane; this difference is not believed to have had any effect on the results of the runs. The flow rate of both gas streams leaving the reactor was measured with soap film burets. Both streams were analyzed periodically by GLC—the feed stream to measure concentrations of hydrogen, ethylene, and ethane that was produced by catalytic hydrogenation on the membrane, and the purge stream to measure the concentration of hydrogen in argon. The table summarizes the run made with the untreated 75Pd-25Ag membrane in Part A; Part B summarizes the run with a similar membrane that had been covered with a 0.1 micrometer thick film of titanium metal. In both runs the membrane was maintained at 450° C.

The experimental rate at which hydrogen permeated the membrane at the start of each run is used to calculate the flux (H$_2$flux calc.) in the absence of poisoning for each experimental value of $P_f^{\frac{1}{2}}-P_p^{\frac{1}{2}}$. The actual measured fluxes are then compared with these calculated fluxes using the ratio meas/calc. A ratio of 1.00 indicates no poisoning while values less than 1.00 indicate poisoning. It is seen that the treated membrane retained a large fraction (Ratio=0.26) of its hydrogen permeability during 120 minutes of exposure to ethylene. In contrast, the untreated membrane was essentially completely poisoned (Ratio—0.00) after 90 minutes exposure to ethylene.

TABLE

| Sample | Time, Min. | Total pres., kPa Feed[a] | Total pres., kPa Product[b] | H$_2$ pres. kPa Feed | H$_2$ pres. kPa Product | $P_F^{\frac{1}{2}} - P_P^{\frac{1}{2}}$[c] | H$_2$flux (meas.) mL/min. | H$_2$flux[d] mL/Min. (calc.) | Ratio: meas./calc. |
|---|---|---|---|---|---|---|---|---|---|
| | | | Part A - Untreated Membrane | | | | | | |
| 1 | 30 | 168 | 119 | 168 | 25 | 8.0 | 54 | 54 | 1.00 |
| 2 | 60 | 169 | 118 | 121 | 19 | 6.6 | 38 | 45 | .84 |
| 3 | 90 | 169 | 118 | 124 | 18 | 6.9 | 36 | 47 | .77 |
| 4 | 120 | 170 | 116 | 88 | 0 | 9.4 | 0 | 63 | .00 |
| 5 | 150 | 170 | 115 | 90 | 0.7 | 8.7 | 1 | 59 | .02 |
| 6 | 165 | 169 | 115 | 169 | 0 | 13.0 | 0 | 88 | .00 |
| 7 | 180 | 169 | 115 | 169 | 0 | 13.0 | 0 | 88 | .00 |
| | | | Part B - Titanium Coated Membrane | | | | | | |
| 8 | 30 | 168 | 114 | 168 | 26 | 7.9 | 30 | 30 | 1.00 |
| 9 | 60 | 168 | 112 | 131 | 12 | 8.0 | 13 | 30 | .43 |
| 10 | 90 | 168 | 112 | 135 | 18 | 7.4 | 18 | 28 | .64 |
| 11 | 120 | 168 | 110 | 70 | 8 | 5.5 | 7 | 21 | .33 |
| 12 | 150 | 168 | 111 | 72 | 6 | 6.0 | 6 | 23 | .26 |
| 13 | 165 | 168 | 112 | 168 | 11 | 9.6 | 11 | 36 | .31 |
| 14 | 180 | 168 | 112 | 168 | 12 | 9.5 | 12 | 36 | 33 |

[a]H$_2$ only in samples 1, 6, 7, 8, 13, 14; H$_2$ + C$_2$H$_4$ in remaining samples.
[b]Argon + H$_2$ that had diffused through membrane.
[c]Calculated from the partial pressure of H$_2$ in the feed and product. Fick's Law and Sievert's Law stated that $$H_2\text{flux} = \frac{DKA}{x} (P_1^{\frac{1}{2}} - P_2^{\frac{1}{2}})$$

where D = Fick's diffusion coefficient, K = proportionality constant including the equilibrium constant for hydrogen dissociation, A = membrane area, x = membrane thickness, P$_1$ and P$_2$ are high and low hydrogen partial pressures. For identical membranes this reduces to H$_2$flux = k(P$_1^{\frac{1}{2}}$ - P$_2^{\frac{1}{2}}$).
[d]H$_2$flux (measured) = H$_2$flux (calculated) for samples 1 and 8. Other values calculated using k in note c above.

Various modifications are possible within the scope of the foregoing disclosure and the appended claims to the invention, the essence of which is that an improved hydrogen diffusion membrane has been supplied, e.g., a palladium or palladium alloy coated with a metal as herein described, for example, titanium has been found effective for diffusion of hydrogen for periods of time considerably longer than the uncoated diffusion membrane; and that processes for use of a coated membrane as herein described have been set forth.

I claim:

1. A process for the dehydrogenation of a hydrocarbon comprising effecting, in the presence of a membrane, said dehydrogenation of said hydrocarbon under dehydrogenation conditions and at a temperature in the range of about 800° to about 1300° F. to produce an unsaturated hydrocarbon and hydrogen in a reaction zone; wherein said membrane is selectively permeable to said hydrogen; wherein said hydrogen produced during said dehydrogenation is continuously removed from said reaction zone by diffusion through said membrane; wherein said membrane comprises (a) a member of the group consisting of palladium and palladium alloys, and (b) at least one metal selected from the group consisting of the transition metals of Group IVB, Group VB and Group VIB of the Periodic Table of Elements; and wherein the surface of (a) is coated with (b).

2. A dehydrogenation process in accordance with claim 1 wherein (b) is a metal selected from the group consisting of zirconium and hafnium.

3. A dehydrogenation process in accordance with claim 1 wherein (b) is titanium.

4. A dehydrogenation process in accordance with claim 3 wherein (a) is a palladium-silver alloy.

5. A dehydrogenation process in accordance with claim 1 wherein (b) is a metal selected from the group consisting of vanadium and niobium..

6. A dehydrogenation process in accordance with claim 1 wherein (b) is tantalum.

7. A dehydrogenation process in accordance with claim 6 wherein (a) is a palladium-silver alloy.

8. A dehydrogenation process in accordance with claims 1, 2, 3, 4, 5, 6 or 7 wherein the coating of (b) on (a) has a thickness in the range of about 0.01 to about 0.1 micrometers.

9. A dehydrogenation process in accordance with claim 8 wherein said temperature is at least about 842° F.

* * * * *